US012126239B2

(12) United States Patent
Ogasawara et al.

(10) Patent No.: US 12,126,239 B2
(45) Date of Patent: Oct. 22, 2024

(54) ELECTRIC POWER UNIT

(71) Applicant: NIDEC CORPORATION, Kyoto (JP)

(72) Inventors: Daisuke Ogasawara, Kyoto (JP); Yuki Ishikawa, Kyoto (JP); Keisuke Nakata, Kyoto (JP); Jun Murakami, Kyoto (JP); Hiroki Akaishi, Kyoto (JP); Kazuyuki Yamamoto, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 217 days.

(21) Appl. No.: 17/950,100

(22) Filed: Sep. 22, 2022

(65) Prior Publication Data

US 2023/0100892 A1 Mar. 30, 2023

(30) Foreign Application Priority Data

Sep. 29, 2021 (JP) .................. 2021-159535

(51) Int. Cl.
*H02K 5/06* (2006.01)
*H02K 5/20* (2006.01)
*H02P 27/06* (2006.01)
*H02K 5/24* (2006.01)

(52) U.S. Cl.
CPC .............. *H02K 5/06* (2013.01); *H02K 5/20* (2013.01); *H02P 27/06* (2013.01); *H02K 5/24* (2013.01)

(58) Field of Classification Search
CPC .. H02K 5/06; H02K 5/18; H02K 5/20; H02K 5/24; H02K 9/19; H02P 27/06
USPC ....................................... 310/164
See application file for complete search history.

(56) References Cited

U.S. PATENT DOCUMENTS

| 7,764,001 | B2 | 7/2010 | Hattori | |
|---|---|---|---|---|
| 7,946,366 | B2 * | 5/2011 | Kano | B60L 50/61 903/952 |
| 8,884,478 | B2 * | 11/2014 | Watanabe | F01D 1/00 310/52 |
| 9,160,207 | B2 * | 10/2015 | Zeng | H02K 5/24 |
| 9,991,759 | B2 * | 6/2018 | White | H02K 5/18 |
| 10,082,193 | B2 * | 9/2018 | Qi | H02K 5/24 |
| 10,615,664 | B2 * | 4/2020 | Ourion | H02K 1/185 |
| 10,621,541 | B2 * | 4/2020 | Andres | G06Q 10/08 |
| 10,770,950 | B2 * | 9/2020 | Lemaitre | H02K 5/24 |
| 10,811,933 | B2 * | 10/2020 | Dubois | H02K 5/24 |

(Continued)

FOREIGN PATENT DOCUMENTS

| DE | 102020125089 A1 * | 4/2021 | ............. H02K 11/33 |
|---|---|---|---|
| JP | 200496845 A | 3/2004 | |

(Continued)

*Primary Examiner* — Alex W Mok
(74) *Attorney, Agent, or Firm* — HAUPTMAN HAM, LLP

(57) ABSTRACT

In an electric power unit which accommodates at least an electric motor in a housing, polygonal rib regions in which polygonal ribs are respectively formed are provided on at least two surfaces of an outer peripheral surface of the housing, and the polygonal rib regions are connected by a circumferential rib. Here, a first axial rib and a second axial rib extending parallel to an axial direction are formed on the outer peripheral surface of the housing, and the polygonal rib region is provided in a portion sandwiched between the first axial rib and the second axial rib. Further, the circumferential rib is formed over the entire part of the polygonal rib region in a circumferential direction. Note that the polygonal rib is a honeycomb rib.

7 Claims, 7 Drawing Sheets

(56) References Cited

U.S. PATENT DOCUMENTS

| | | | |
|---|---|---|---|
| 10,855,139 B2* | 12/2020 | Dubois | H02K 5/24 |
| 2006/0113847 A1* | 6/2006 | Randall | H02K 41/031 |
| | | | 310/12.29 |
| 2008/0258569 A1* | 10/2008 | Kano | H02K 5/24 |
| | | | 310/51 |
| 2009/0206709 A1* | 8/2009 | Kakuda | H02K 5/15 |
| | | | 310/68 D |
| 2011/0193432 A1* | 8/2011 | Takechi | H02K 11/05 |
| | | | 310/68 D |
| 2015/0256045 A1* | 9/2015 | White | H02K 9/04 |
| | | | 310/59 |
| 2017/0033639 A1* | 2/2017 | Harris | H02K 5/18 |
| 2017/0113544 A1* | 4/2017 | Tsujimoto | B60K 1/00 |
| 2019/0157922 A1* | 5/2019 | Tangudu | H02K 1/146 |
| 2020/0127527 A1* | 4/2020 | Nakamatsu | H02K 7/116 |
| 2020/0127528 A1* | 4/2020 | Nakamatsu | H02K 5/20 |
| 2020/0313506 A1* | 10/2020 | Murakami | H02K 5/24 |
| 2020/0408297 A1* | 12/2020 | Ishikawa | B60K 17/04 |

FOREIGN PATENT DOCUMENTS

| | | | | |
|---|---|---|---|---|
| JP | 200557935 A | | 3/2005 | |
| JP | 201323136 A | | 2/2013 | |
| JP | 2020058219 A | * | 4/2020 | H02K 1/2706 |
| JP | 2020137269 A | * | 8/2020 | H02K 1/20 |
| JP | 2021057973 A | * | 4/2021 | H02K 11/33 |

* cited by examiner

ELECTRIC POWER UNIT

CROSS-REFERENCE TO RELATED APPLICATIONS

The present invention claims priority under 35 U.S.C. § 119 to Japanese Patent Application No. 2021-159535 filed on Sep. 29, 2021, the entire content of which is incorporated herein by reference.

FIELD OF THE INVENTION

The present invention relates to an electric power unit using an electric motor as a driving source.

BACKGROUND

In recent years, an electric vehicle (EV) that uses an electric motor as a driving source has been actively developed instead of a vehicle that uses an engine discharging exhaust gas as a driving source. Further, the electric vehicle is equipped with an electric power unit configured by integrally incorporating, in a housing, the electric motor (an alternating current (AC) motor) that is the driving source, an inverter that converts a direct current (DC) current from a DC power supply, such as a battery, into an AC current and supplies the AC current to the electric motor; a speed reduction mechanism that decelerates (increases a torque for) rotation of the electric motor, a differential mechanism (differentiating mechanism) that differentiates the rotation output from the speed reduction mechanism to left and right output shafts, and the like.

Meanwhile, uncomfortable vibration and noise are imparted to an occupant in a case where the vibration of the electric power unit incorporating the electric motor, which is a vibrating source, is large, and thus, it is desired to suppress the vibration and noise of the electric power unit to be low.

As a method for suppressing the vibration of the electric motor to be low, there are known a method of reducing vibration by changing a distance of an air gap at each tooth tip of a stator core by a magnetic structure of the electric motor to offset a specific electromagnetic vibrating force component generated in the stator core, a method of reducing vibration of a specific order by offsetting an electromagnetic force generated in the stator core by current control, and the like.

There is also known a method of enhancing rigidity of a motor housing that accommodates the electric motor to suppress vibration and noise of the motor housing to be low. For example, conventionally, there is proposed a configuration in which the number of reinforcing ribs of a flange of a motor housing is set to a number that is not a divisor of the number of slots of a stator, is not a multiple of the number of slots, is not a divisor of the number of poles of a rotor, and is not a multiple of the number of poles.

Further, conventionally, there is proposed a configuration in which a rubber mount supporting a power plant including an engine against a vehicle body frame is joined to the power plant via an engine-side mount bracket, and the movement of the rubber mount is restrained by a restraint device including an electromagnet joined to the engine-side mount bracket and a vehicle-frame-side mount bracket via a prop to increase the spring rigidity of the rubber mount, whereby vibration of the power plant generated when the engine is started and stopped is suppressed to be low.

Meanwhile, in the electric power unit, there is a problem that the housing resonates due to the rotational vibration of the electric motor or vibration caused by meshing of gears and becomes a noise source so that a noise level increases.

SUMMARY

An exemplary electric power unit of the present invention is an electric power unit that accommodates at least an electric motor in a housing. In the electric power unit, polygonal rib regions in which polygonal ribs are respectively formed are provided on at least two surfaces of an outer peripheral surface of the housing, and the polygonal rib regions are connected by a circumferential rib.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present invention will be described with reference to the drawings.

Figure 1:
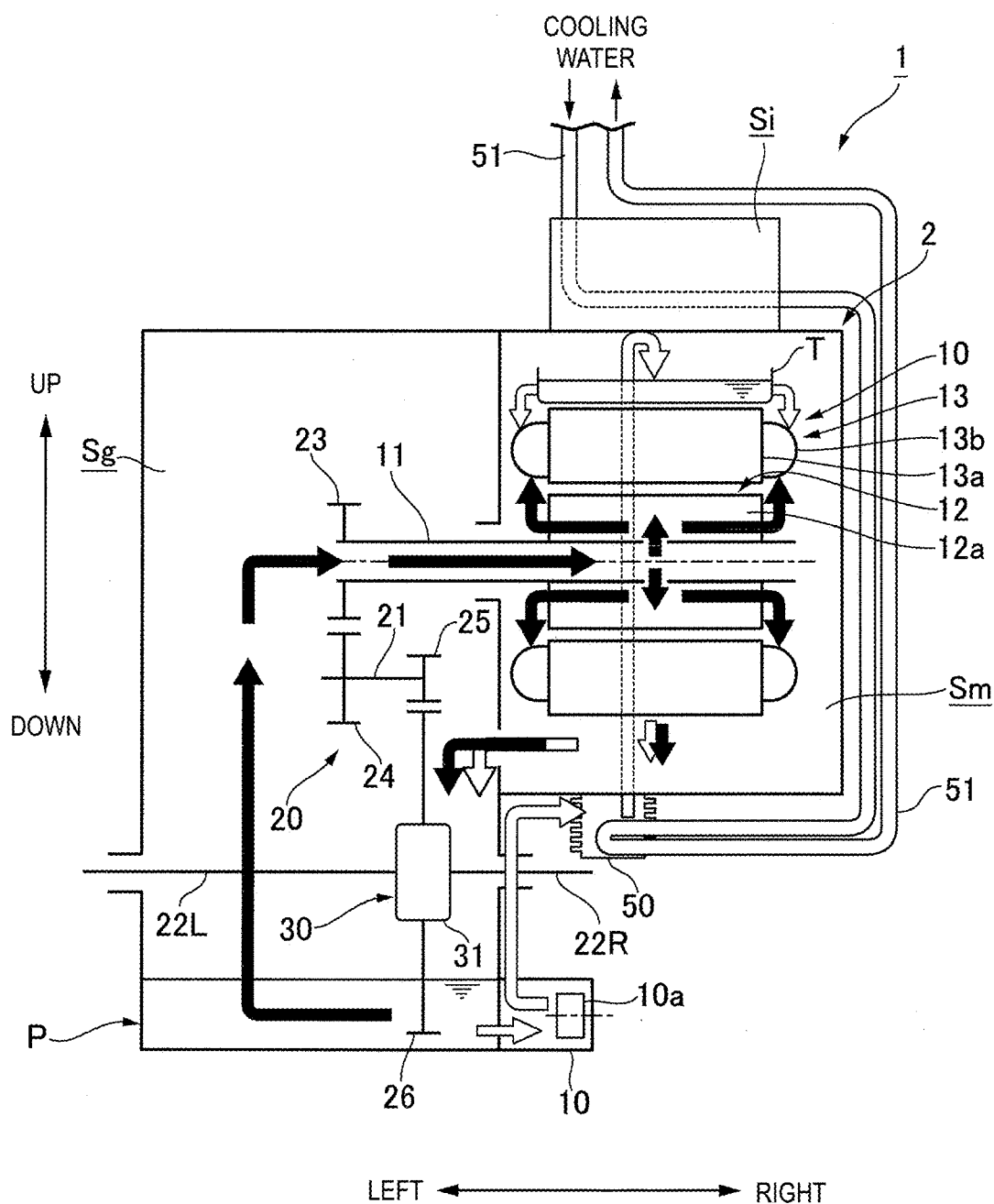
FIG. 1 is a longitudinal sectional view schematically illustrating the entire configuration of an electric power unit according to the present invention as viewed from the rear side of a vehicle.

FIG. 1 is a longitudinal sectional view schematically illustrating the entire configuration of an electric power unit according to the present invention as viewed from the rear side of a vehicle, and an electric power unit 1 illustrated in the drawing is mounted on an electric vehicle (EV). In FIG. 1, arrow directions are defined as an "up-down" direction and a "left-right" direction (vehicle width direction), respectively, as illustrated in the drawing.

In the electric power unit 1 according to the present embodiment, an electric motor 10, which is a driving source, is accommodated in a motor accommodating portion (motor chamber) Sm formed in the right half inside a housing 2 produced by aluminum die-casting, and a speed reduction mechanism 20 and a differential mechanism (differentiating mechanism) 30 are accommodated in a gear accommodating portion (gear chamber) Sg formed in the left half inside the housing 2. Further, an inverter (not illustrated) is accommodated in an inverter accommodating portion Si formed in an upper portion of the housing 2. The inverter is configured to convert a DC current from a battery, which is a DC power supply and is not illustrated, into an AC current and supply the AC current to the electric motor 10, and includes a control element such as an insulated gate bipolar transistor (IGBT).

Here, the electric motor 10 is a three-phase AC motor, and includes a rotor 12, which rotates together with a hollow shaft (motor shaft) 11 passing through the center of the rotor 12, and a cylindrical stator 13 fixed around the rotor 12. Here, the shaft 11 is horizontally arranged along a left-and-right direction (vehicle width direction) in FIG. 1, and the rotor 12 fixed to the outer periphery of the shaft 11 includes a rotor core 12a and a permanent magnet (not illustrated) embedded in the rotor core 12a. Further, the stator 13 includes a stator core 13a and a coil 13b, and the coil 13b is electrically connected to the inverter.

Meanwhile, inside the gear accommodating portion Sg, a counter shaft 21 and left and right output shafts 22L and 22R are arranged in parallel to the shaft 11. The speed reduction mechanism 20 includes: a first gear 23 affixed to an outer periphery of a left end portion facing the inside of the gear accommodating portion Sg of the shaft 11; a second gear 24 and a third gear 25 having different diameters and affixed to the counter shaft 21; and a ring gear 26 having a large diameter connected to a differential case 31 of the differential mechanism 30. Here, the first gear 23 and the second gear 24 mesh with each other, and the third gear 25 and the ring gear 26 mesh with each other.

The differential mechanism 30 functions to absorb a rotational difference between left and right drive wheels at the time of cornering of a vehicle or the like and transmit power to each of the left and right output shafts 22L and 22R and has a known configuration, and thus, a detailed description thereof is omitted here, but a pair of pinion gears and side gears respectively meshing with the pinion gears are accommodated in the differential case 31. Note that an oil pan P is provided at the bottom of the gear accommodating portion Sg of the housing 2, and a predetermined amount of oil is stored in the oil pan P. Further, a portion (outer peripheral portion) of the ring gear 26 is immersed in the oil stored in the oil pan P.

In the electric power unit 1 according to the present embodiment, an oil pump 40 and an oil cooler 50, which are auxiliary machines, are attached to the housing 2. Here, the oil pump 40 is rotationally driven by a pump motor 41 which is a driving source. Further, a cooling water pipe 51 extending from a radiator (not illustrated) and passing through the inverter accommodating portion Si is connected to the oil cooler 50, and the oil is cooled in the oil cooler 50 by heat exchange with a cooling water. Then, the cooling water provided to cool the oil in the oil cooler 50 is returned from the cooling water pipe 51 to the radiator (not illustrated). In this manner, the cooling water continuously circulates in a closed circuit to cool the inverter (not illustrated) and the oil accommodated in the inverter accommodating portion Si.

In the electric power unit 1 configured as described above, when a DC current is output from the battery (not illustrated), the DC current is converted into an AC current by the inverter (not illustrated). When the AC current is supplied to the electric motor 10, the electric motor 10 is rotationally driven by electromagnetic induction action. That is, the rotor 12 and the shaft 11 of the electric motor 10 are rotationally driven at a predetermined speed, and the rotation is decelerated at a predetermined reduction ratio by the speed reduction mechanism 20 and transmitted to the differential mechanism 30. Then, the rotation transmitted to the differential mechanism 30 is distributed to the left and right by the differential mechanism 30 and transmitted to each of the left and right output shafts 22L and 22R, and both the output shafts 22L and 22R rotate at a predetermined speed.

Although not illustrated, the left and right output shafts 22L and 22R are connected to left and right axles, respectively, and the left and right drive wheels are attached to end portions of the left and right axles, respectively. Therefore, when the left and right output shafts 22L and 22R rotate as described above, the drive wheels (not illustrated) attached to both the axles are rotationally driven, whereby the vehicle travels at a predetermined speed.

When the electric power unit 1 is driven as described above, the oil pump 40 is driven by the pump motor 41, and the cooling water circulates through the closed circuit by a cooling water pump (not illustrated).

Meanwhile, since a portion (the outer peripheral portion) of the ring gear 26 is immersed in the oil stored in the oil pan P provided at the bottom of the gear accommodating portion Sg of the housing 2 as described above, the oil in the oil pan P is scraped up by the rotation of the ring gear 26. A part of the scraped oil is supplied to each portion of the electric motor 10 through the shaft 11 as indicated by an arrow in FIG. 1 to be used for lubrication and cooling of each portion. Then, the oil provided for lubrication and cooling of each portion of the electric motor 10 drops into the oil pan P and is collected as indicated by an arrow in FIG. 1.

Further, another part of the oil scraped up by the ring gear 26 is supplied for lubrication and cooling of the speed reduction mechanism 20 and the differential mechanism 30, and then, drops into the oil pan P to be collected. Then, a part of the oil in the oil pan P is sent to the oil cooler 50 by the oil pump 40, and is cooled by heat exchange with the cooling water flowing through the cooling water pipe 51 in the oil cooler 50 as indicated by an arrow in FIG. 1. Then, the cooled oil is sent to a tray T arranged in an upper portion of the electric motor 10, and the oil overflowing from the tray T falls to the electric motor 10 to be used for lubrication and cooling of each part of the electric motor 10 as indicated by an arrow in FIG. 1. The oil supplied for lubrication and cooling of each portion of the electric motor 10 in this manner is returned to the oil pan P at the inner bottom of the gear accommodating portion Sg to be collected.

Next, a specific configuration of the electric power unit 1 according to the present invention will be described hereinafter with reference to FIGS. 2 to 6.

Figure 2:
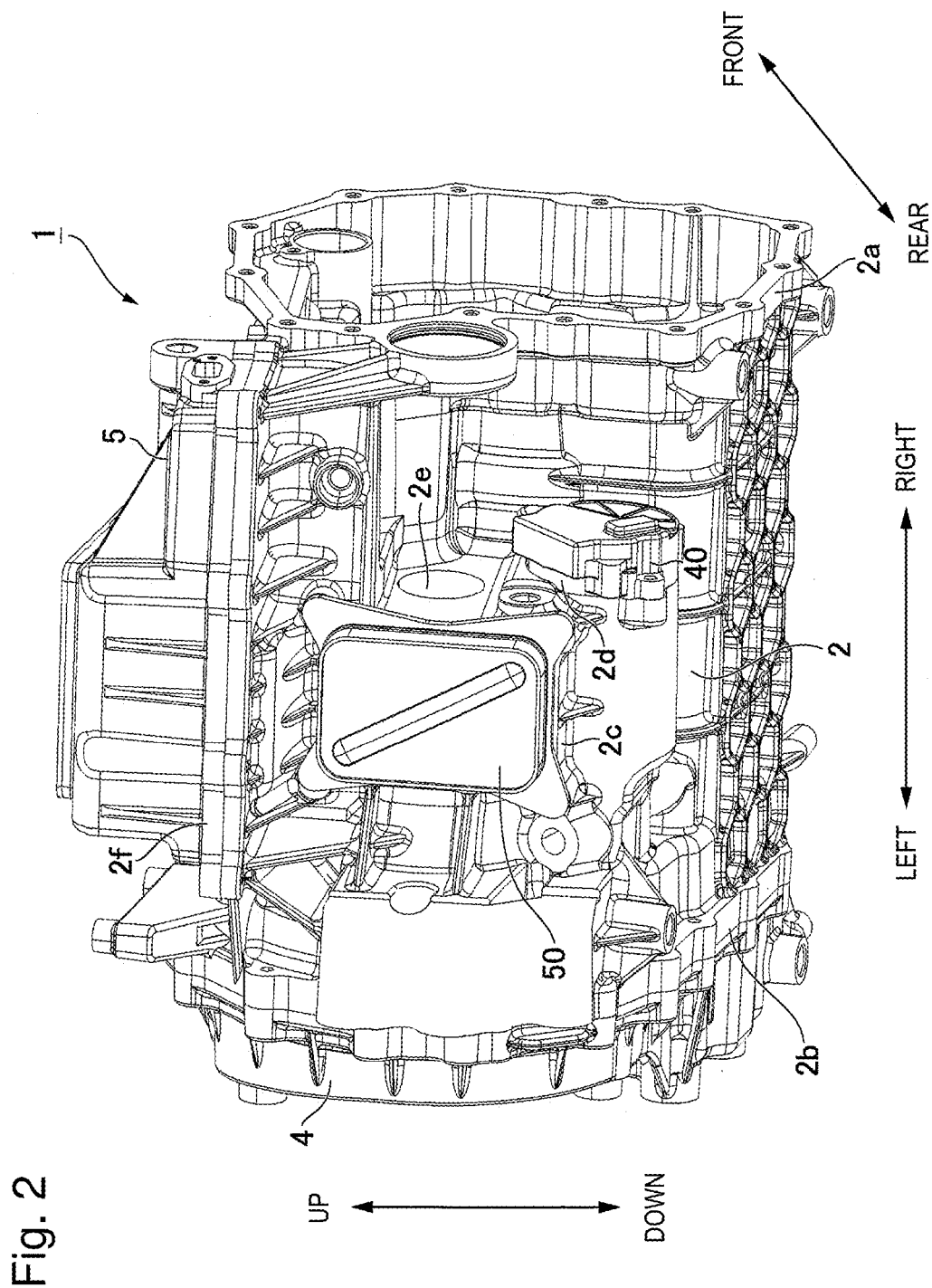
FIG. 2 is a perspective view of the electric power unit according to the present invention as viewed from the obliquely right rear side.
Figure 3:
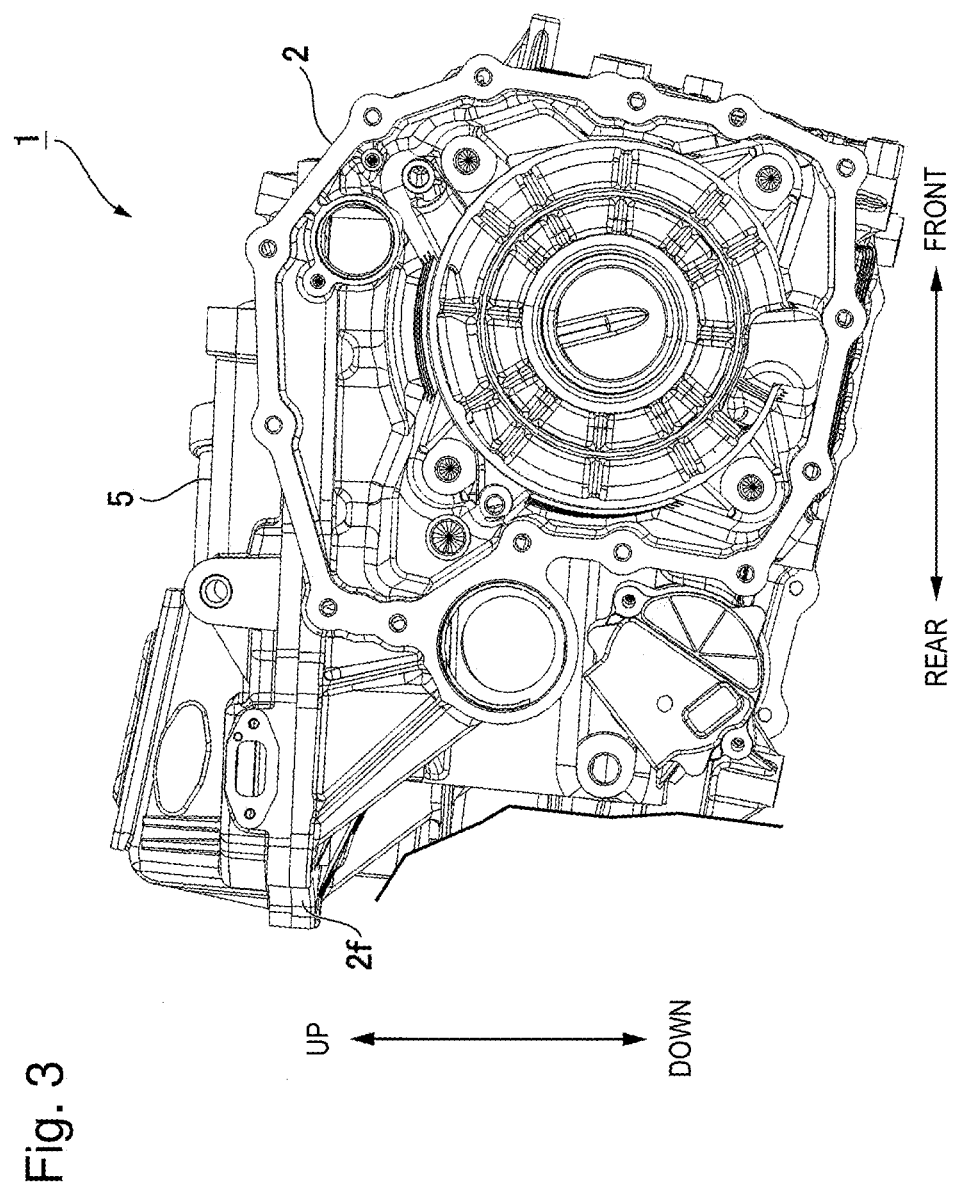
FIG. 3 is a right side view of the electric power unit according to the present invention.
Figure 4:
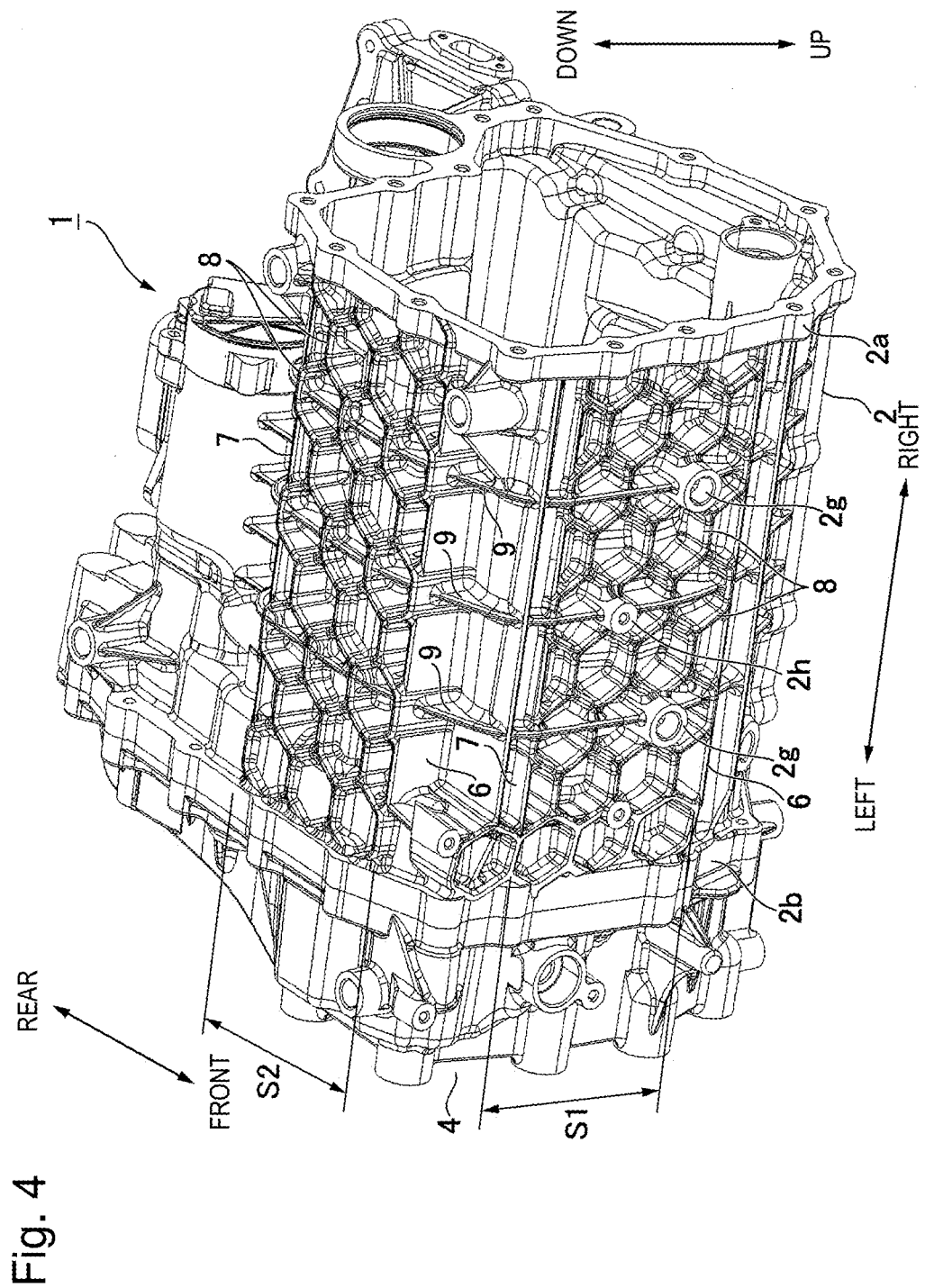
FIG. 4 is a perspective view of the electric power unit according to the present invention as viewed from a bottom surface side toward the obliquely right front side.
Figure 5:
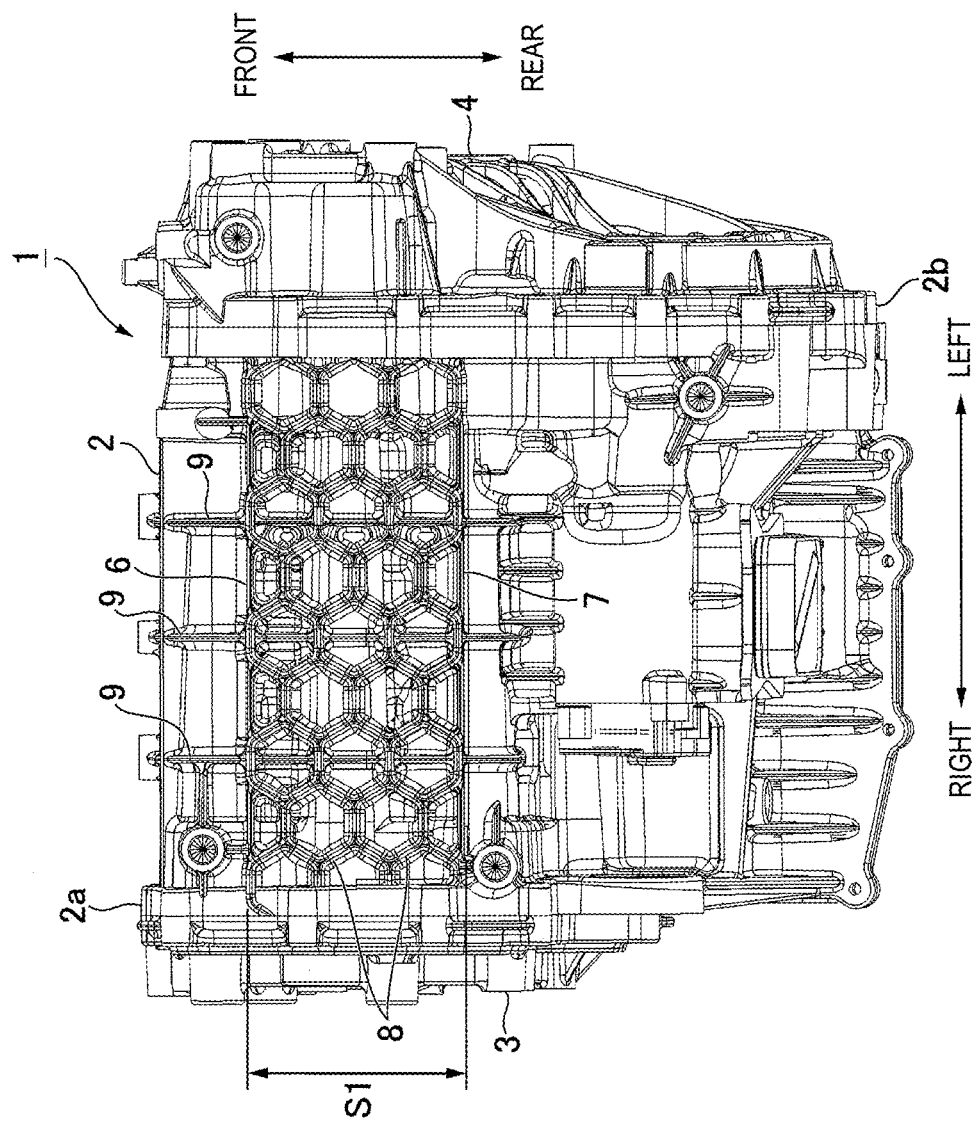
FIG. 5 is a front view of the electric power unit according to the present invention as viewed from the front side.
Figure 6:
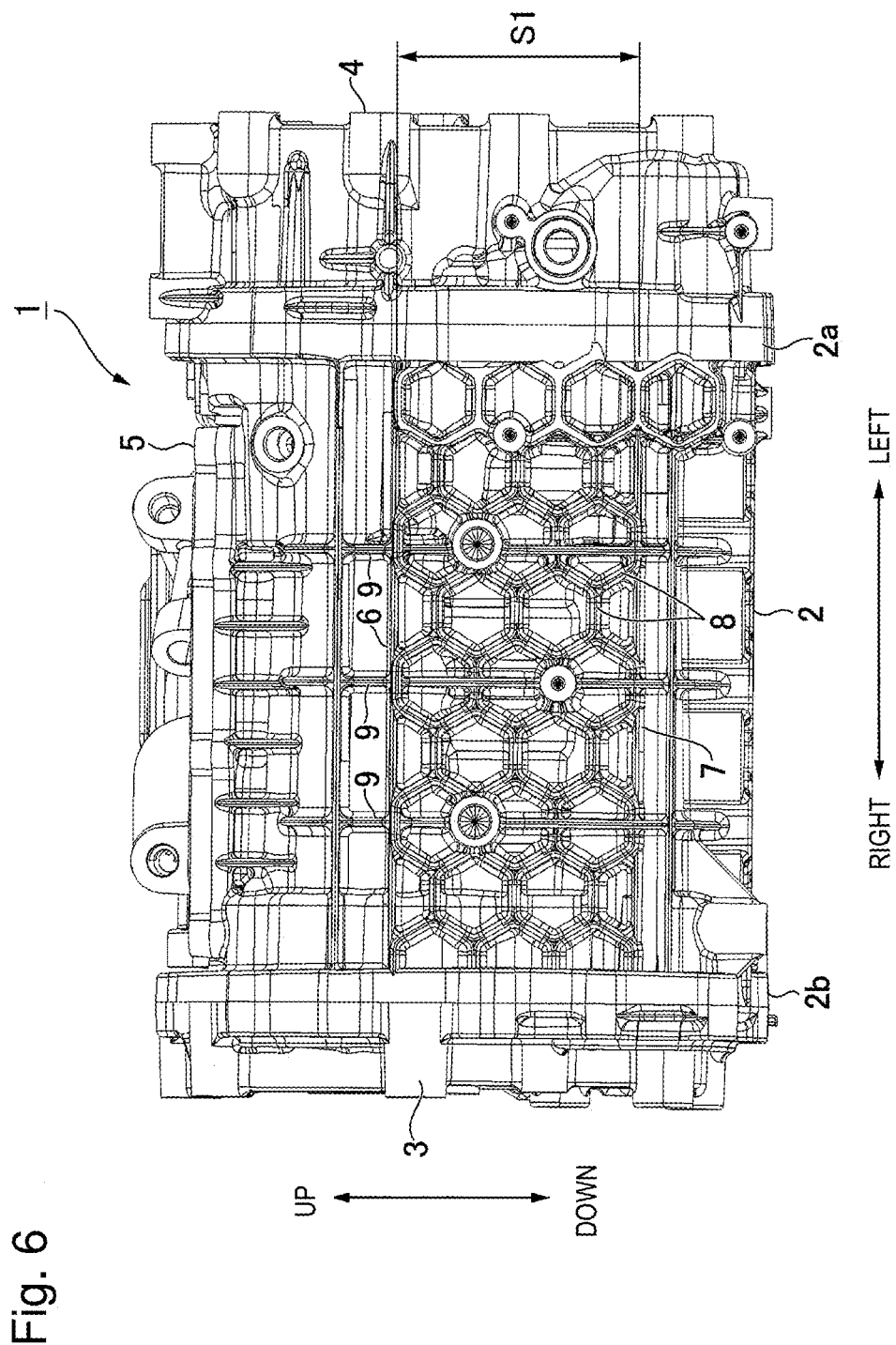
FIG. 6 is a bottom view of the electric power unit according to the present invention.

FIG. 2 is a perspective view of the electric power unit according to the present invention as viewed from the obliquely right rear side; FIG. 3 is a right side view of the electric power unit; FIG. 4 is a perspective view of the electric power unit as viewed from the bottom surface side toward the obliquely right front side; FIG. 5 is a front view of the electric power unit as viewed from the front side; and FIG. 6 is a bottom view of the electric power unit. In FIGS. 2 to 6, arrow directions are "front-and-rear", "left-and-right", and "up-and-down" directions, respectively, as illustrated in the drawings.

As illustrated in FIG. 1, the electric motor 10 is accommodated in the right half inside the housing 2 of the electric power unit 1, the speed reduction mechanism 20 and the differential mechanism 30 are accommodated in the left half, and openings (not illustrated) are formed on the left and right of the housing 2. As illustrated in FIG. 2, flange portions 2a and 2b are formed on peripheral edges of the left and right openings of the housing 2, respectively, a motor cover 3 is detachably attached to the right flange portion 2a by a plurality of bolts (not illustrated), and a gear cover 4 is detachably attached to the left flange portion 2b by a plurality of bolts (not illustrated). That is, the opening on the right side of the housing 2 is closed by the motor cover 3, and the opening on the left side is closed by the gear cover 4.

As illustrated in FIG. 2, an oil cooler attachment portion 2c having a substantially rectangular block shape is integrally formed at a central portion of a rear surface of the housing 2 in the left-and-right direction (vehicle width direction), and the oil cooler 50 is attached to the oil cooler attachment portion 2c. Further, a pump attachment portion 2d is integrally formed on the obliquely lower right side of the oil cooler attachment portion 2c on the rear surface of the housing 2, and the oil pump 40 is attached to the pump attachment portion 2d. As illustrated in FIG. 2, a circular hole 2e through which the left and right output shafts 22L and 22R (see FIG. 1) pass is formed in the oil cooler attachment portion 2c along the left-and-right direction.

Furthermore, a flange portion 2f is integrally formed on a rear upper surface of the housing 2 as illustrated in FIGS. 2 and 3, and a space surrounded by the flange portion 2f constitutes the inverter accommodating portion Si illustrated in FIG. 1. Then, the inverter (not illustrated) is accommodated in the inverter accommodating portion Si.

An upper surface of the inverter accommodating portion Si (see FIG. 1) is opened, and such an upper surface opening is closed by the inverter cover 5 detachably attached to the flange portion 2f by a plurality of bolts (not illustrated). Note that the inverter cover 5 is also integrally molded by aluminum die-casting.

Meanwhile, in the housing 2 of the electric power unit 1 according to the present embodiment, a first axial rib 6 and a second axial rib 7 extending in parallel along an axial direction (the left-and-right direction, that is, vehicle width direction) are erected on a front surface and a bottom surface, respectively, and both axial ends of each of the first axial rib 6 and the second axial rib 7 are respectively connected to left and right flange portions 2a and 2b integrally formed in the housing 2 as illustrated in FIGS. 4 to 6. In this manner, both the axial ends of each of the first axial ribs 6 and the second axial ribs 7 are respectively connected to the left and right flange portions 2a and 2b having high rigidity of the housing 2, whereby the rigidity of the first axial rib 6 and the second axial rib 7 is enhanced, and as a result, the rigidity of the housing 2 itself is enhanced.

Further, rectangular portions surrounded by the right and left flange portions 2a and 2b on the front surface and the bottom surface of the housing 2, the first axial rib 6, and the second axial rib 7 are polygonal rib regions S1 and S2. In these polygonal rib regions S1 and S2, a plurality of polygonal ribs (hexagonal ribs in the present exemplary embodiment, and hereinafter referred to as "honeycomb ribs") 8 are formed in an orderly manner.

Further, the polygonal rib regions S1 and S2 respectively formed on the front surface and the bottom surface of the housing 2 are connected by a plurality of (three in the present embodiment) circumferential ribs 9 extending in a direction perpendicular to the axis (circumferential direction). More specifically, in the present embodiment, the three circumferential ribs 9 are integrally formed over the entire part of each of the two polygonal rib regions S1 and S2 in the circumferential direction in parallel to each other at appropriate intervals along the left-and-right direction (vehicle width direction), and each of the circumferential ribs 9 passes through the center of the honeycomb ribs 8. As illustrated in FIGS. 4 and 6, cylindrical bosses 2g and 2h are integrally formed at longitudinally intermediate portions of the three circumferential ribs 9 on the front surface of the housing 2.

As described above, since the plurality of honeycomb ribs 8 are formed in each of the polygonal rib regions S1 and S2 defined by the first axial rib 6 and the second axial rib 7 on the front surface and the bottom surface of the housing 2 and the left and right flange portions 2a and 2b in the present embodiment, the rigidity of the front surface and the bottom surface of the housing 2 is enhanced, and as a result, the rigidity of the entire housing 2 is enhanced. Here, each of the two first axial ribs 6 and each of the two second axial ribs 7 defining each of the polygonal rib regions S1 and S2 is connected to the left and right flange portions 2a and 2b having a relatively large thickness and high rigidity. Each of the polygonal rib regions S1 and S2 is connected to each other by the three circumferential ribs 9, and the plurality of honeycomb ribs 8 are formed in each of the polygonal rib regions S1 and S2. Therefore, the rigidity of the front surface and the bottom surface of the housing 2 in which the polygonal rib regions S1 and S2 are formed is enhanced, and the rigidity of the entire housing 2 is effectively enhanced. In particular, since the bosses 2g and 2h having high rigidity are integrally formed at the longitudinally intermediate portions of the three circumferential ribs 9 arranged in the polygonal rib region S1 on the front surface of the housing 2 in the present embodiment, the rigidity of the circumferential ribs 9 is enhanced by the bosses 2g and 2h. Further, since the three circumferential ribs 9 pass through the center of the honeycomb ribs 8 in each of the polygonal rib regions S1 and S2, the rigidity of the housing 2 in the left-and-right direction (vehicle width direction) is well balanced.

Even in a case where the housing 2 resonates due to vibration at the time of driving the electric motor 10, which is a vibrating source, or vibration caused by meshing of the gears 23, 24, 25, and 26 of the speed reduction mechanism 20, a noise level associated with the resonance of the housing 2 is suppressed to be low as a result of enhancing the rigidity of the housing 2 as described above.

Figure 7:
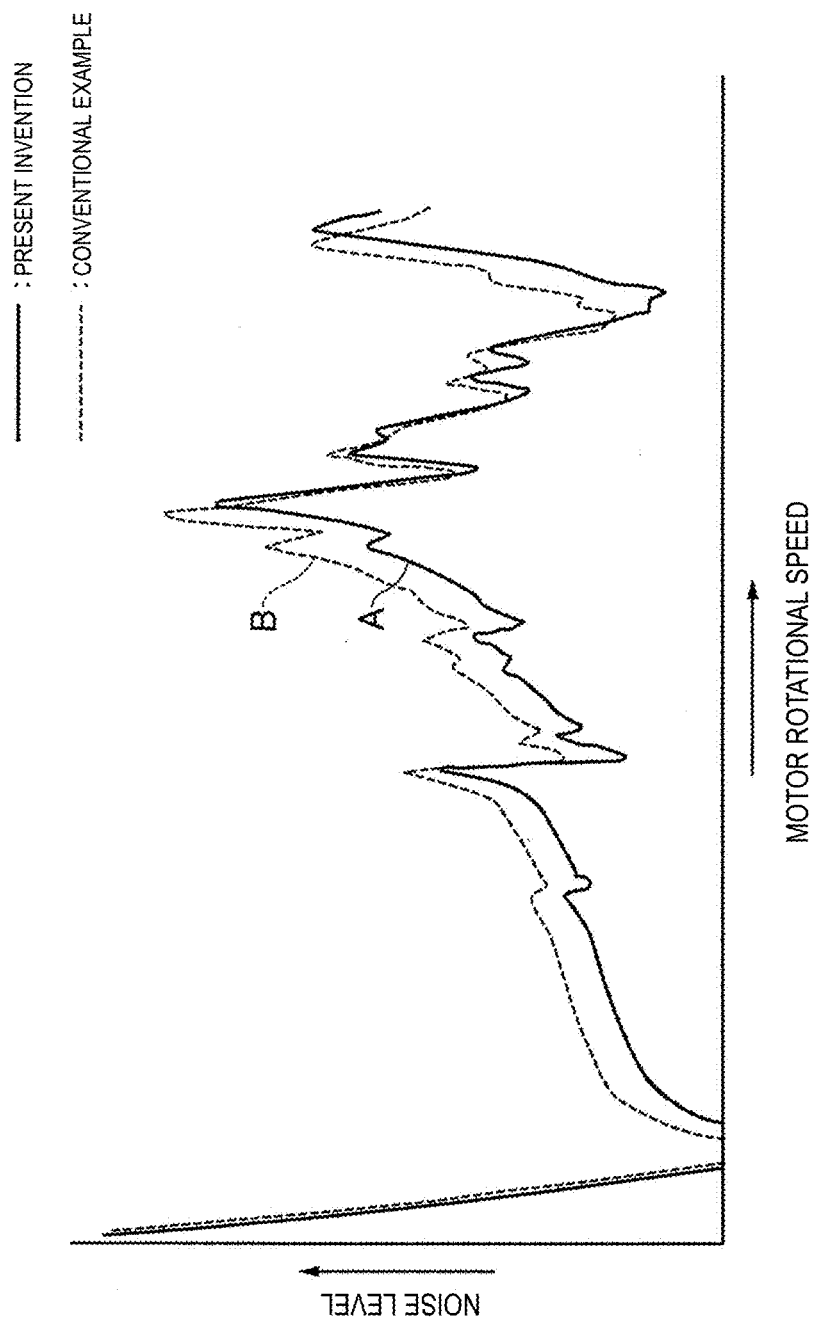
FIG. 7 is a view illustrating a relationship between a motor rotational speed and a noise level of the electric power unit according to the present invention in comparison with that of a conventional electric power unit.

Here, FIG. 7 illustrates a relationship between a motor rotational speed and the noise level of the electric power unit 1 according to the present invention in comparison with that of a conventional electric power unit. The noise level of the electric power unit 1 according to the present invention has been suppressed to be lower (specifically, to be lower by about 4 dB) than the conventional noise level, indicated by a broken line B in FIG. 7, in the entire range of the motor rotational speed as indicated by a solid line A in FIG. 7.

Note that, assuming that a circular constant is n, a mass is m, and a spring constant (rigidity) is k, a natural frequency f that generates resonance is obtained by the following formula:

$$f = 1/2\pi \cdot (k/m)^{1/2}$$

and thus, as illustrated in FIG. 7, primary, secondary, and tertiary resonance points and so on (points at which peaks of the noise level appear) shift to a high rotational speed side when the rigidity (spring constant k) is increased.

Although the embodiment in which the present invention is applied to the electric power unit mounted on the electric vehicle (EV) has been described above, the present invention is similarly applicable to an electric power unit mounted on a hybrid electric vehicle (HEV), a plug-in hybrid electric vehicle (PHV), or the like.

Although the polygonal rib regions S1 and S2 are provided on the two surfaces, that is, the front surface and the bottom surface of the housing 2 in the above embodiment, the polygonal rib region can be provided on any surface of the housing 2. Further, the polygonal rib 8 formed in the polygonal rib regions S1 and S2 is the honeycomb rib having a regular hexagonal shape in the above embodiment, but the shape of the polygonal rib is arbitrary, and any shape can be adopted as long as being a polygon including a triangle, a quadrangle, a pentagon, and the like.

Furthermore, the number of the circumferential ribs 9 is three in the above embodiment, but the number of the circumferential ribs 9 is arbitrary and is not limited to three.

Additionally, the present invention is not limited to the embodiment described above, and various modifications can be made within the scope of the technical idea described in the scope of claims, the specification, and the drawings.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. An electric power unit that accommodates at least an electric motor in a housing, the electric power unit comprising:

polygonal rib regions provided on at least two surfaces of an outer peripheral surface of the housing, the polygonal rib regions respectively including polygonal ribs; and a circumferential rib connecting the polygonal rib regions.

2. The electric power unit according to claim 1, further comprising a first axial rib and a second axial rib extending parallel to an axial direction and formed on the outer peripheral surface of the housing, wherein the polygonal rib region is provided in a portion sandwiched between the first axial rib and the second axial rib.

3. The electric power unit according to claim 1, wherein the circumferential rib is formed over an entire part of the polygonal rib region in a circumferential direction.

4. The electric power unit according to claim 1, further comprising a boss integrally formed at a longitudinally intermediate portion of the circumferential rib.

5. The electric power unit according to claim 1, wherein both axial ends of the first and second axial ribs are connected to flange portions formed at both axial ends of the housing.

6. The electric power unit according to claim 1, wherein the circumferential rib passes through a center of the polygonal rib.

7. The electric power unit according to claim 1, wherein the polygonal rib is a honeycomb rib.

* * * * *